United States Patent [19]

Pitkin et al.

[11] Patent Number: 5,341,477

[45] Date of Patent: Aug. 23, 1994

[54] BROKER FOR COMPUTER NETWORK SERVER SELECTION

[75] Inventors: Richard P. Pitkin, Lowell; John P. Morency, Chelmsford, both of Mass.

[73] Assignee: Digital Equipment Corporation, Maynard, Mass.

[21] Appl. No.: 103,722

[22] Filed: Aug. 6, 1993

Related U.S. Application Data

[63] Continuation of Ser. No. 924,390, Aug. 3, 1992, abandoned, which is a continuation of Ser. No. 314,853, Feb. 24, 1989, abandoned.

[51] Int. Cl.⁵ .................. G06F 13/00; G06F 15/16
[52] U.S. Cl. .................. 395/200; 395/325; 364/DIG. 1; 364/281.6; 364/284.4; 364/264; 364/940.61
[58] Field of Search .......... 395/200, 325, 725

[56] References Cited

U.S. PATENT DOCUMENTS

| | | | |
|---|---|---|---|
| 4,757,267 | 7/1988 | Riskin | 379/113 |
| 4,780,821 | 10/1988 | Crossley | 364/200 |
| 4,800,488 | 1/1989 | Agrawal et al. | 364/200 |
| 4,858,120 | 8/1989 | Samuelson | 364/401 |
| 4,897,781 | 1/1990 | Chang et al. | 364/200 |
| 4,914,571 | 4/1990 | Baratz et al. | 364/DIG. 1 |
| 4,949,248 | 8/1990 | Caro | 364/200 |
| 5,005,122 | 4/1991 | Griffin et al. | 364/200 |

*Primary Examiner*—Eddie P. Chan
*Attorney, Agent, or Firm*—Kenyon & Kenyon

[57] ABSTRACT

In a computer network, a broker mechanism allocates a plurality of servers, each having an available resource capacity, to a plurality of clients for delivering one of several services to the clients. The broker operates by monitoring a subset of all available servers capable of delivering the requested service. The allocation is based on developing a network policy for the plurality of servers by collecting a local policy for each of the servers. The broker receives client requests for the services and based on the network policy and available resource capacity suggests one of the servers, monitors in its subset for that particular service, to one of the clients making a request. The server suggested enforces its local policy by not allowing any connections exceeding its available resource capacity.

24 Claims, 10 Drawing Sheets

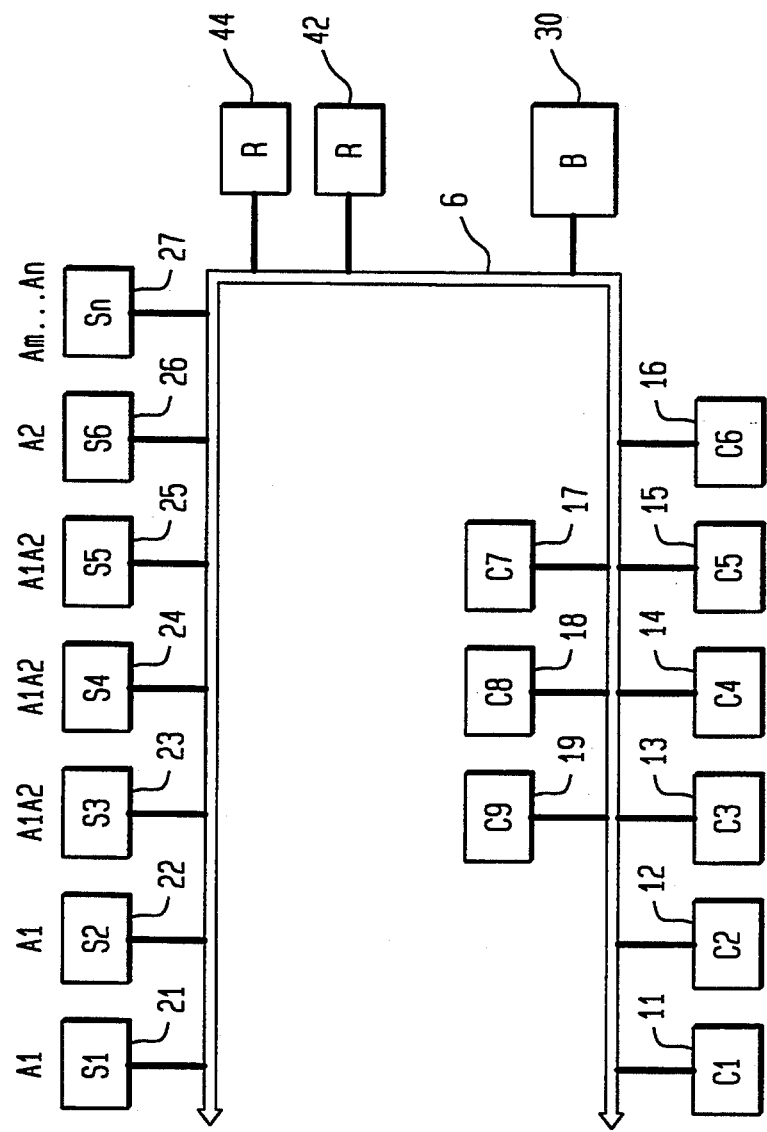

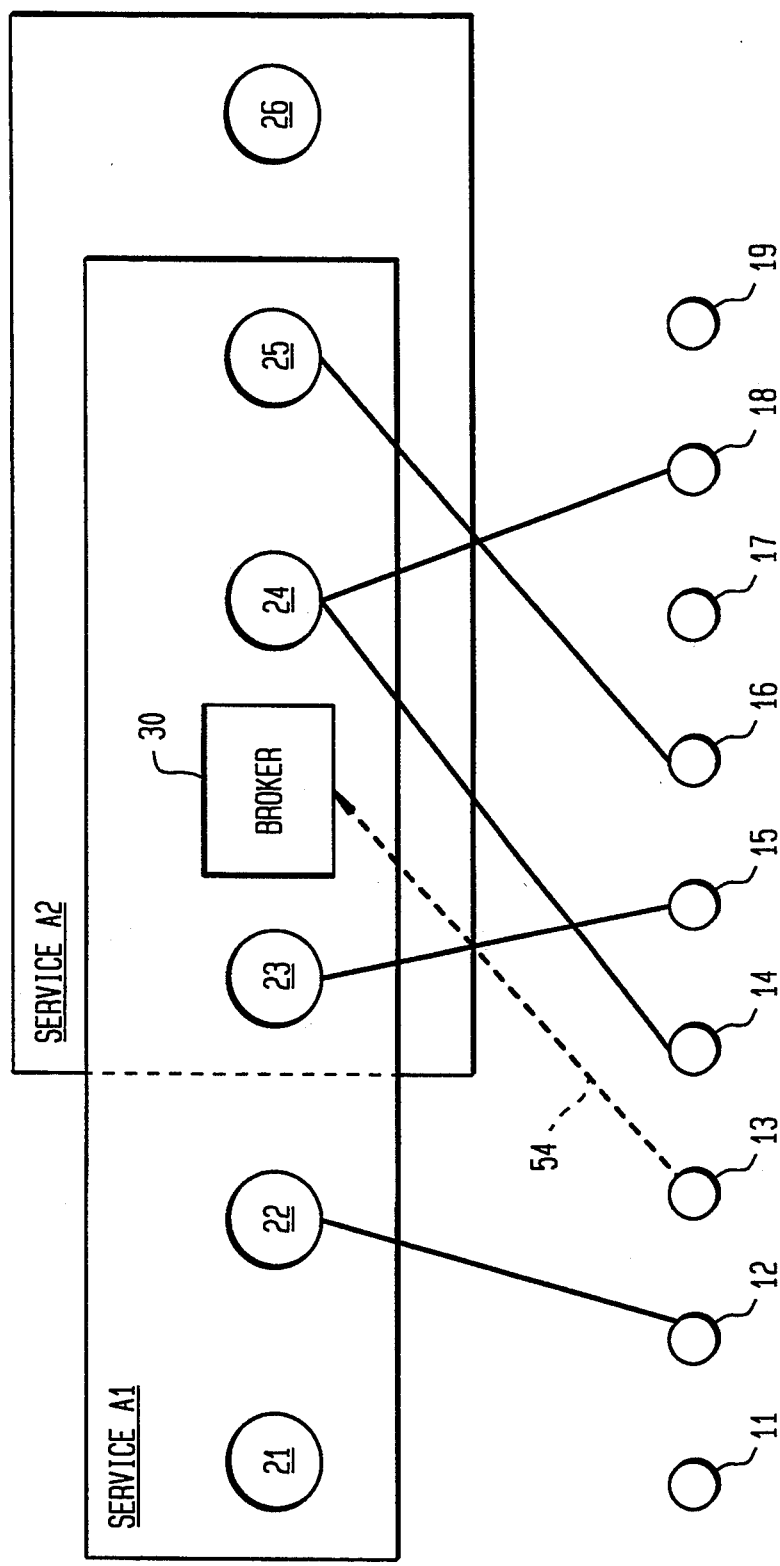

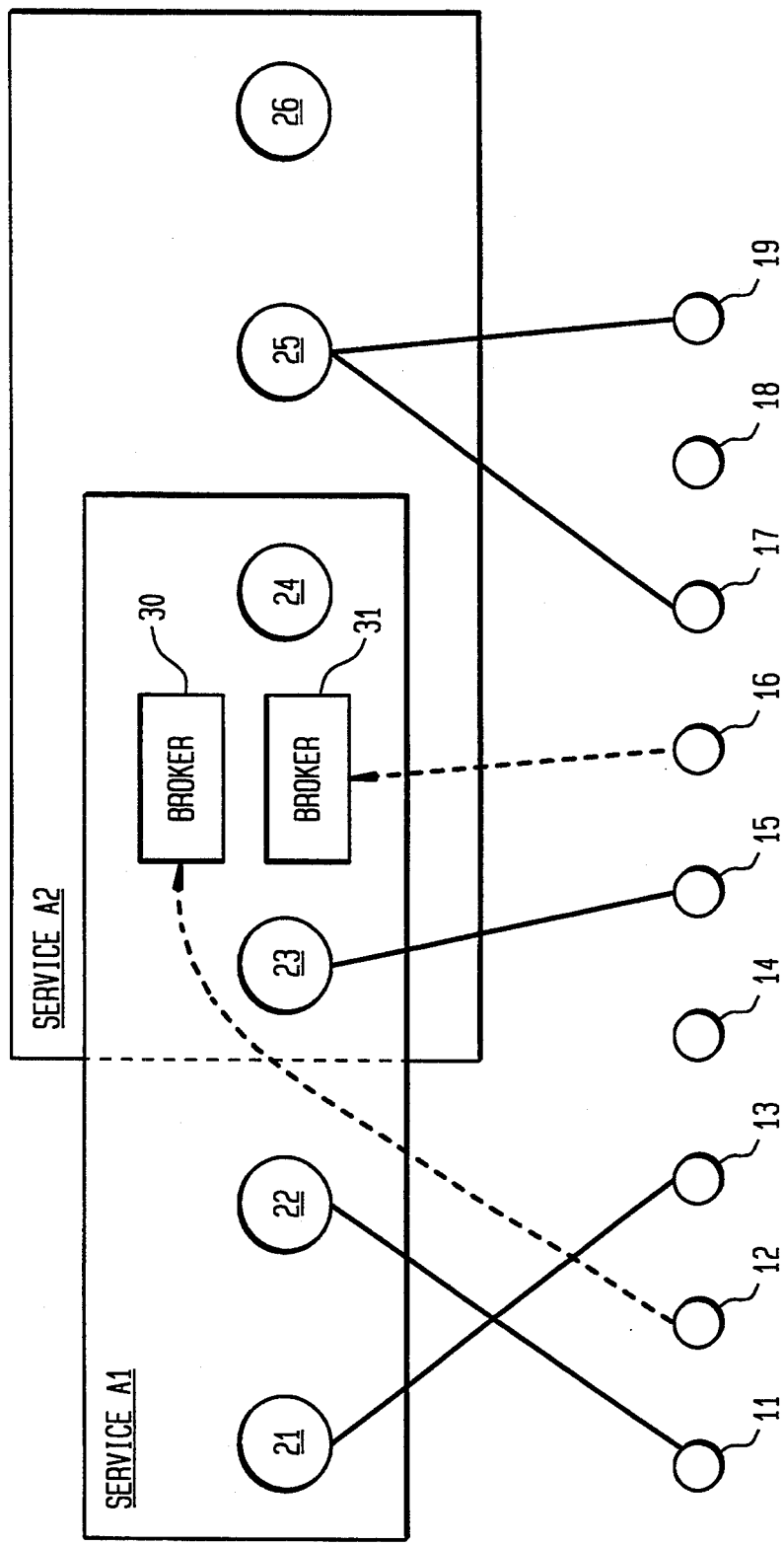

BROKER FOR COMPUTER NETWORK SERVER SELECTION

This is a continuation of application Ser. No. 07/924,390, filed Aug. 3, 1992, abandoned, which in turn is a continuation of application Ser. No. 07/314,853, filed Feb. 24, 1989 (now abandoned.

FIELD OF THE INVENTION

This invention relates generally to the allocation of resources within a computer network architecture and, more particularly, to the use of a broker mechanism which responds to a client's or end user's request for some service and suggests a server to the client capable of supplying the requested service.

BACKGROUND OF THE INVENTION

Present day computer network architectures have become more and more complex. For example, a network may comprise multiple devices, such as several computer systems, terminals, peripherals, etc., all linked together in order to exchange information and share resources.

Other more complex networks may comprise thousands of devices of varying technical capabilities. In many applications, both local area networks (LANs) and wide area networks (WANs) are connected to form parts of a single network. For example, a network can include a local area component, a wide area component and a component involving communication between computers of different vendors, such as a multi-vendor communication network.

The process for designing computer networks of this type involves a complex analysis of the customer requirements, the price factor for the various products, the necessary communication lines, and other technical and business considerations. The allocation and planned use of the various resources to support the network needs is now part of the normal capacity planning cycle done by a network manager when setting up the network for a customer.

Because of the potential to form complex networks, a computer network client has a wide range of resources available to supply requested service. This advantage, however, also adds to the problem of networks and resource management. It is therefore desirable to obtain delivery of these services through network service names. A service offers clients capacity to use resources accessible through the network.

In these computer networks, a server, made up of both hardware and software, may be used as an agent between a client and one or more resources to deliver the requested service to the client. The server's software program provides "actions" for a client using one or more resources. These actions, for example, may be transmission of packets over a communication line—a communication server; computations in a problem—a CPU server; information access in a data base—a data base server; network addressing information distributed throughout a network and associated with a requested service—a name server; or other similar and multiple combinations of these functions.

Because networks may include multiple servers generally delivering the same action, a client may access any one of these servers with equal delivery of the action. One of the disadvantages in the prior art is the inability to group these servers providing the same action. This grouping of servers can be seen as a "network service". To overcome shortcomings of the prior art an ideal system for a client to request a service in a complex network should fulfill two requirements. First, the request must include generic accessing of a particular network service name to provide a higher level interface abstraction than the current practice where each client knows of all server possibilities. This has the advantage of substantially simplifying the decision process for the client in the case where multiple servers can deliver the requested service. The only requirement is the network service name rather than the name of each and every server offering the requested service. Second, the requested service must be guaranteed to exist for the client within the server for the duration of a connection.

To supply a service to a client, it is known to use a broker mechanism coupled to the network for scheduling a server to a requesting client. The broker receives a request for access to a service from a client and transmits to the client the name of a server which can deliver the service to the client. One known type of broker operates by assigning an entire server to a client irrespective of the capacity needed by the client.

A problem with the above broker method is the inefficient use of network resources. Prior brokers must continuously monitor all of the servers coupled to the network, increasing the brokers overhead and the network traffic. Because the resource capacities of the servers and the necessary performance level to be allocated to the client are dynamic factors, a broker mechanism which can dynamically allocate servers to clients using a predetermined policy is needed.

SUMMARY OF THE INVENTION

The present invention is a broker method and apparatus which, on one hand monitors the dynamic status of a set of servers and, on the other hand, responds to requests from accessing clients concerning which member of that server set is capable of providing the requested service.

The service limitations for the requested service are preferably established as a matter of policy during the network design and modelling process by a system or network manager. Based upon the policy, the broker thus suggests to the client a server which is best able to satisfy the client's service request. The broker enables a client to use a service even though the client is unaware of the presence or absence of any individual servers within the network.

According to one aspect of the invention, the client then requests the service from the recommended server, and the server is responsible for granting the request only if the server currently has the required capacity available for that service. Since the server makes the final determination of whether it has the available capacity to provide the requested service, there is no risk of overloading a server because the broker has out of date status information—for example, as when a server becomes busy subsequent to its last status message transmitted to the broker.

As indicated above, the suggestion of a server preferably is based on the network policy developed by the network manager for the particular network. Because of the complex nature of present networks, a modelling process is used to develop a local policy for each server in the network to deliver a service, based on the individual customer requirements for the network. The collection of local policies determines the overall network policy for a given service.

In most cases, the network policy is based on the servers' capacity to deliver a given service. The capacity of the given service, however, can be changed with the addition or subtraction of servers to the network. In either case, the changes are made known to the broker and are transparent to the clients in the network.

Upon startup, the broker develops a linked list data structure containing sets of server entries for each offered service corresponding to the local policy obtained for each server. According to one aspect of the invention, at any given time, the broker monitors a subset of those entries as a "preview window". The broker regularly rotates different servers into and out of the preview window. The broker suggests an entry in the preview window, upon receiving a client request, provided the entry has the available resources for the client.

An advantage of the preview window is to substantially decrease the number of servers which must be monitored by the broker in a network. Because the broker maintains current status information on only a subset of the servers during a given time interval, the number of status messages required to be transmitted over the network is reduced. This results in a reduction of computational overhead for the broker and communications overhead on the network.

In this embodiment, the broker assigns servers in a round robin fashion to ensure that the loss of a single server does not have a major impact upon clients that request access at similar times. The application of the round robin server distribution, however, is regulated by use of a "scan weight" parameter for each server. The scan weight is defined as the number of client requests which can be satisfied by a server before that server is removed from the preview window.

The advantages of the broker can be achieved with only a minimal increase in connect time from client to server. This is because the broker uses the preview window to monitor server status information prior to receiving any client requests. The broker also uses the scan weight value to reduce the frequency by which the preview window is changed thus further increasing accurate server suggestions by the broker. Therefore, the incremental client connect time, as opposed to a direct client-server connection, is only increased by the time needed to contact the broker and receive a suggestion.

In a further embodiment, the broker suggests to a client both the top server entry and the next active server entry in the preview window. By suggesting two possible servers, the broker compensates for the case in which a failure of the first server is alleviated without the need to recontact the broker, thus decreasing the load on the network.

Another embodiment of the present invention makes use of multiple brokers for suggesting servers to multiple different clients. The ability to have multiple brokers running simultaneously provides a highly reliable service by alleviating any single point of failure.

BRIEF DESCRIPTION OF THE DRAWINGS

FIG. 2 is a block diagram of a network architecture including the present invention.

FIG. 2A is a block diagram conceptually illustrating the broker mechanism of the present invention.

FIG. 7 is a conceptual block diagram of an embodiment of the present invention.

DETAILED DESCRIPTION OF THE INVENTION

I. Network Environment

Figure 1:
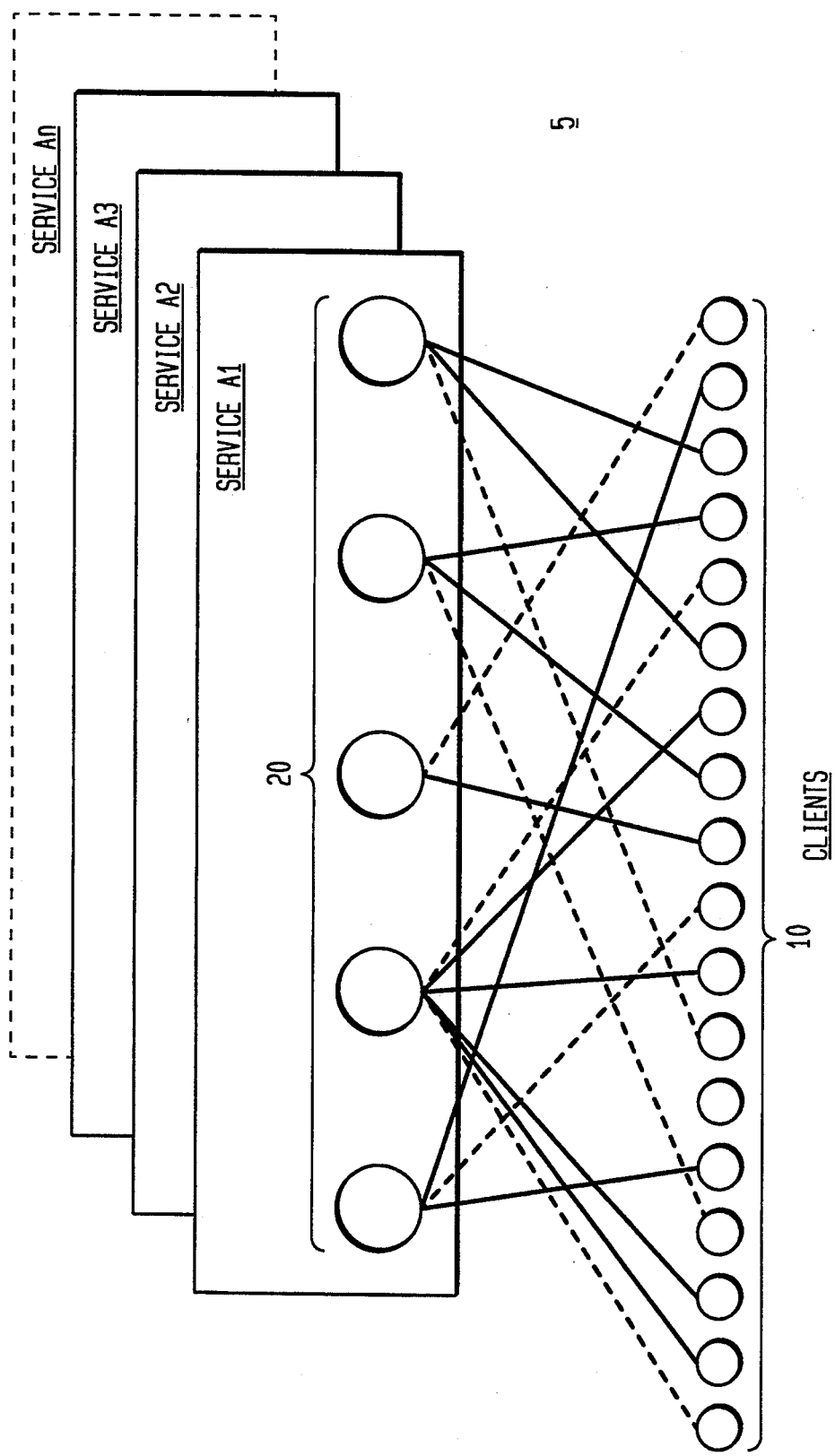
FIG. 1 is a block diagram illustrating the environment of the present invention.

Referring to FIG. 1, there is shown a model block diagram of a system enhanced by the present invention. In a network 5, a plurality of users or clients, generally designated 10, each have access to a plurality of servers, generally designated 20. Some number of the servers 20 can provide access to services $A_1$-$A_n$ requested by one of the clients 10. When the client 10 requests access to a service via one of the servers 20, a connection is made from the selected client 10 through the server 20. As can be seen in FIG. 1, a plurality of servers 20 are available to make the requested connection. Therefore, it becomes a problem to know which client 10 should connect to which server 20. Further, the resource capacity of the server 20 must be known in order to make an appropriate connection. Because the server resources have various and different capabilities, i.e., small CPU size, large CPU size, used and unused capacities, different serial line speeds, etc., different servers 20 are more appropriate for a particular client request. Also, it is necessary to know the service level desired by the client 10.

FIG. 2 is an example of a network architecture incorporating the present invention. The network 5 includes a plurality of servers 21–27 and clients 11–19 coupled to a communications medium 6, e.g., an Ethernet. A broker, conceptually shown as block 30, is also coupled to the communications medium 6. Further, a distributed repository 42 or 44 is illustratively coupled to the communication medium 6 for storing network policy. These repositories may be replications of each other distributed throughout the network. Each server can provide access to various services $A_1$-$A_n$ for a requesting client 11–19. In operation, the broker 30 receives the local policies from the repository 42 or 44 for building data structures for each service supported by the servers, processes client requests for a service, and responds in accordance with network policy with one or more server suggestions to the client.

FIG. 2A conceptually illustrates the architectural diagram of FIG. 2. A broker mechanism 30 is used to suggest to clients 11–19 an appropriate server 21–26 for delivering the requested service (service A1 or A2). Further, individual servers 23, 24 and 25 can provide more than one service. While FIG. 2A only illustrates two services, it is apparent that the broker 30 can suggest servers to clients requesting any number of different services. When a particular client, shown as client 13, requests access to service A1, the client 13 places a request with the broker 30 on path 54. The broker 30 suggests an appropriate server from server set 21–24 to the client 13.

II. Modelling

A modelling process is used to efficiently determine the allocation of resources when designing a network. The modelling is accomplished by the network manager both prior to implementing the network and upon making subsequent changes to the network. In the modelling process factors are taken into account such as whether data transmissions during the use of a particular network service are of a bulk or interactive (bursty) nature and their effect on resource capacities. Because bulk data transfers usually have a high transfer rate i.e., an entire floppy diskette of data is transferred and, on the other hand, interactive data transfers generally are of a short, bursty nature, it is generally possible in a given server to support more interactive data transfers than bulk data transfers.

Figure 3:
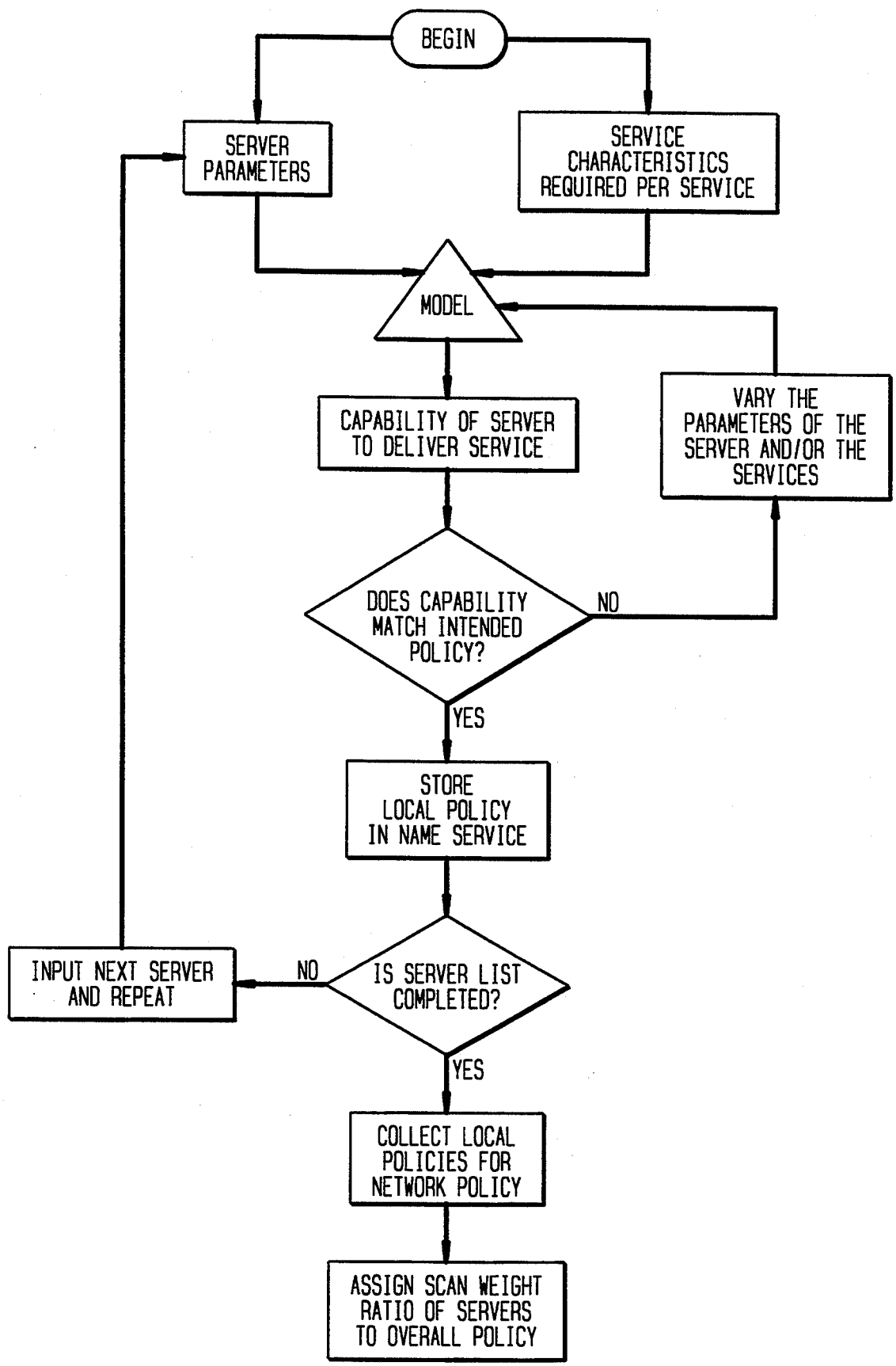
FIG. 3 is a flow chart describing the modelling of a network policy according to the present invention.

FIG. 3 is a flow chart depicting the modelling process that occurs in the development of the network policy to be implemented by the broker mechanism for each service. The modelling begins by determining the service characteristics that are desired by the customer, i.e. the various possible actions, and the parameters of the server in the network, i.e. the resources of the server. Both the server parameters and required service characteristics are inputs to a modelling process such as is described in "Processor—sharing queuing model for time-shared systems with bulk arrivals" Kleinrock et al, *Networks* v.1 n.1 pp. 1-13 (1971) or "Models for Computer Networks" Kleinrock, IEEE Int Conference on Communications, Conf. Rec, Boulder, Colo., June 9-11, Session 21 pp. 9-16 (1969).

III. Network Policy

The modelling process produces a prediction of the measured performance characteristics of each server based on the performance desired for each service offered by that server. This prediction is compared to the desired performance for each service to check if the server meets the performance limitations. If the prediction matches the desired performance, then the local policy for that particular server has been obtained. However, if the prediction does not match the desired performance, then the local policy parameters of the server and/or the service characteristics are varied before being modeled again. This process continues until the server prediction matches the desired performance thus developing the local policy for the server.

Next, the modelling process checks whether a local policy has been established for each server in the network. If not, then the above process is repeated. Once all local policies have been determined, the local policies are collected to form a network policy for the entire network. The network policy is stored in the distributed repository 42 or 44 as shown in FIG. 2.

When customers set up their network, they therefore establish a network policy to allocate resources for each service. Policy decisions must be cognizant of all of the available factors made prior to implementing the system, i.e., based on the physical constraints of the hardware, the communication lines, the price factor for the product, the usage load, i.e., heavy, medium, light, fast CPUs, slow CPUs and other appropriate factors. A broker implements the network policy when suggesting an appropriate server to maximize the efficiency of the complex network.

IV. Broker

An advantage of the present invention allows the broker 30 (FIG. 2A) to operate when there is: a network policy for a given service; a method to easily determine the current usage of the server relative to the established local policy; and servers which can enforce their local policy e.g. by rejecting any connection attempted beyond their local policy limit. These factors are used by the broker mechanism 30 to suggest a server 21-26 to a requesting client 13 based on the collection of local server policies in the broker.

The data structures of the broker mechanism 30 are formed from an application of the distributed repository storing the network policy for each service from which the broker linked list data structures can be built. Many conventional means such as name server computer programs are available to facilitate the creation of these broker linked list data structures. The distributed repository is a non-volatile storage area which holds the collection of local policies and the attributes of how each supporting server supports a service.

The repository is distributed throughout the network. As part of the broker startup procedures, the broker 30 extracts from the repository attribute information about each of the services it implements, i.e., service $A_1$-$A_n$ as shown in FIG. 1. The repository is necessary to store the network policy in the event of a broker failure as the broker functions to compare current server capacity to network policy.

Figure 4:
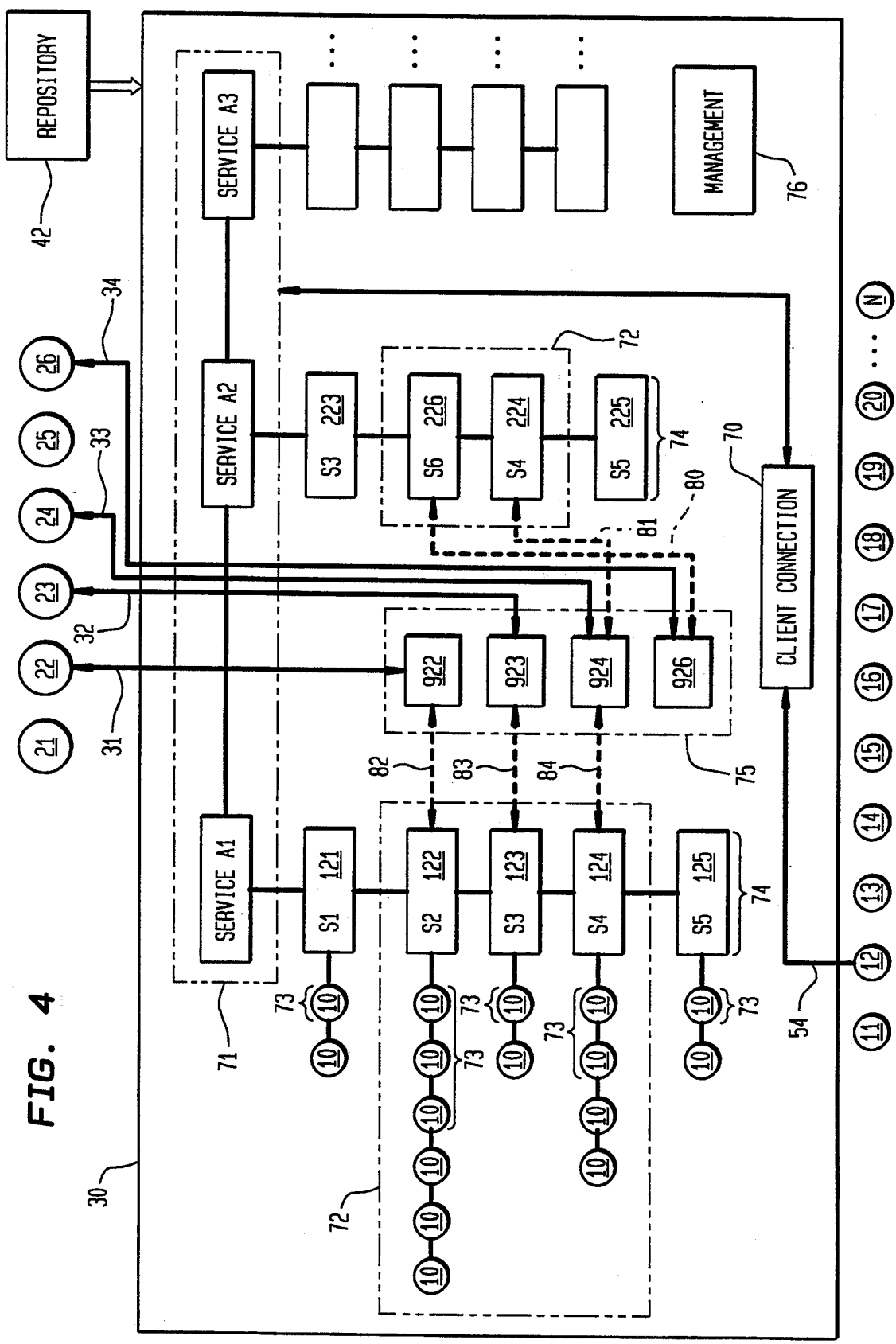
FIG. 4 is a conceptual block diagram of the broker mechanism in FIG. 2.

FIG. 4 is a conceptual diagram showing an example of the data structures produced by the code in the broker mechanism 30. The data structure shown inside the broker 30 are linked lists of entries created by the broker code.

The broker obtains the entries to create the data structures from the distributed repository 42. A service list 71 is generated for those services found in the repository 42. Further, a server list 74 is created for each service in the service list 71 to hold the local policy information for the particular servers 21-26 that support the service. Lastly, the broker creates a "server status block" which contains a number of server connection entries 922, 923, 924 and 926, there being one connection entry in the server status block for each server 22, 23, 24 and 26 which currently is in the "preview window" of at least one service. (Preview status will be defined below.) Each connection entry stores the current status information for its corresponding server. The policy information contained in the server list and service lists remains static, while the server status block information is of a dynamic or volatile nature.

A server connection section 75 of the broker 30 establishes communication paths 31-34 with the servers referred to in the preceding paragraph. The communication paths 31-34 allow the broker to poll each coupled server (22, 23, 24, 26) to receive its status. The status of the servers 22, 23, 24 and 26 is stored in connection entries 922, 923, 924 and 926, respectively, within the server status block. In response to subsequent client requests for service, the broker examines these connection entries to determine each coupled server's capacity or availability to deliver a requested service, as will be described below with reference to FIGS. 5 and 5A. The server connection section 75 therefore supports a list of connection entries 922-926 that map (80-84) to a select number of server entries in the server lists 74 for each of the services in service list 71. As shown in FIGS. 4, a server 24 can overlap between service offerings. The server connection section 75 may therefore have several server lists 74 with entries pointing to a single server connection. This pooling of server connections is important for providing multiple service offerings from one broker location.

1. Preview Window

During the broker's startup, data structures are developed in the broker. The data structures include a service list 71 and server lists 74 having sets of server entries (121-125) and (223-226) corresponding to the servers (21-25) and (23-26) for each service ($A_1$ & $A_2$) in the service list 71. The data structure information is provided from the repository 42. The broker 30 then monitors, via couplings 80-84, subsets (22, 23 & 24) and (24 & 26) of the servers from the above sets to form a preview window for each service. The size of the preview window is predetermined according to the network policy and stored as an attribute of the network policy in the repository 42. The preview windows 72 ensure that a sufficient number of servers, i.e., based upon the network policy for each service, are coupled and providing status to the broker 30 for each service before a client request is made. The size of the preview window generally reflects the number of servers necessary to satisfy the average rate of client requests received by the broker. By using preview windows, the connection time from client to servers is reduced by accumulating status and policy information in the broker in advance of the client request.

Without using the preview windows 72, the preconnection time for a client to receive data from a service would be the accumulation of: (client connect time to broker) (broker connect time to server location)+ (server startup time)+(accumulation of connect times needed to find a server location having unassigned capacity). By monitoring the resources of the servers contained in the preview windows via communication paths 31-34 associated with each service, the broker 30 can suggest the top entry in the preview window to a client requesting that particular service. The suggestion is made provided the entry has the available resources. If an entry does not have the available resources it is removed from the preview window. Servers are thus regularly rotated in and out of the preview window.

Figure 5:
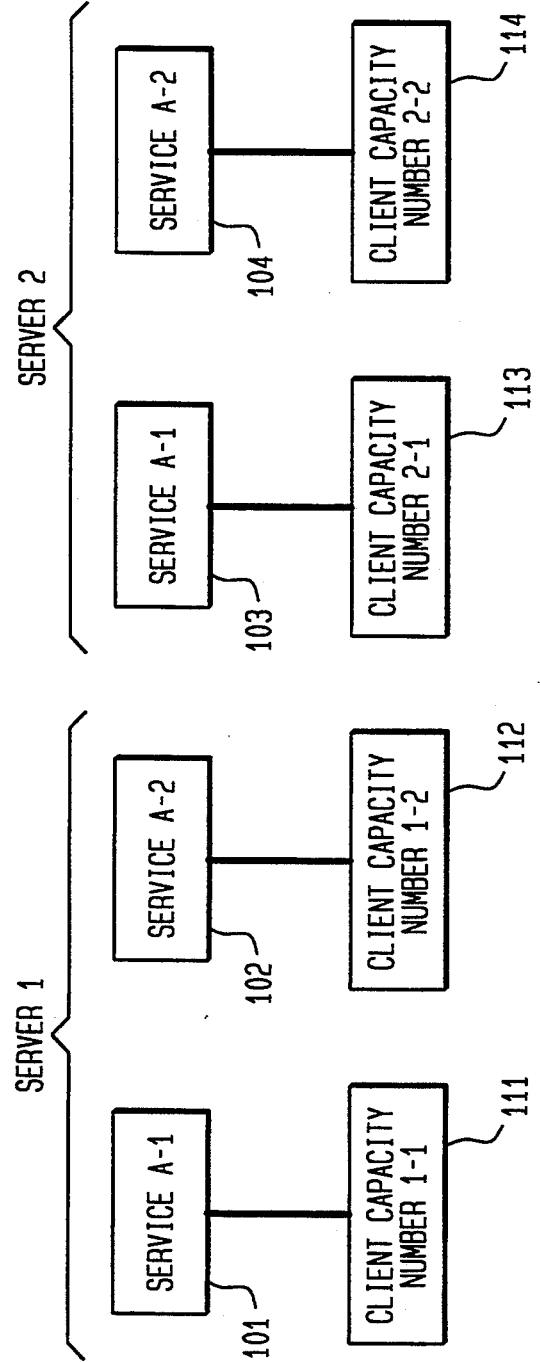
FIGS. 5 and 5A are examples showing the operation of server data structures used in the present invention.
Figure 5A:
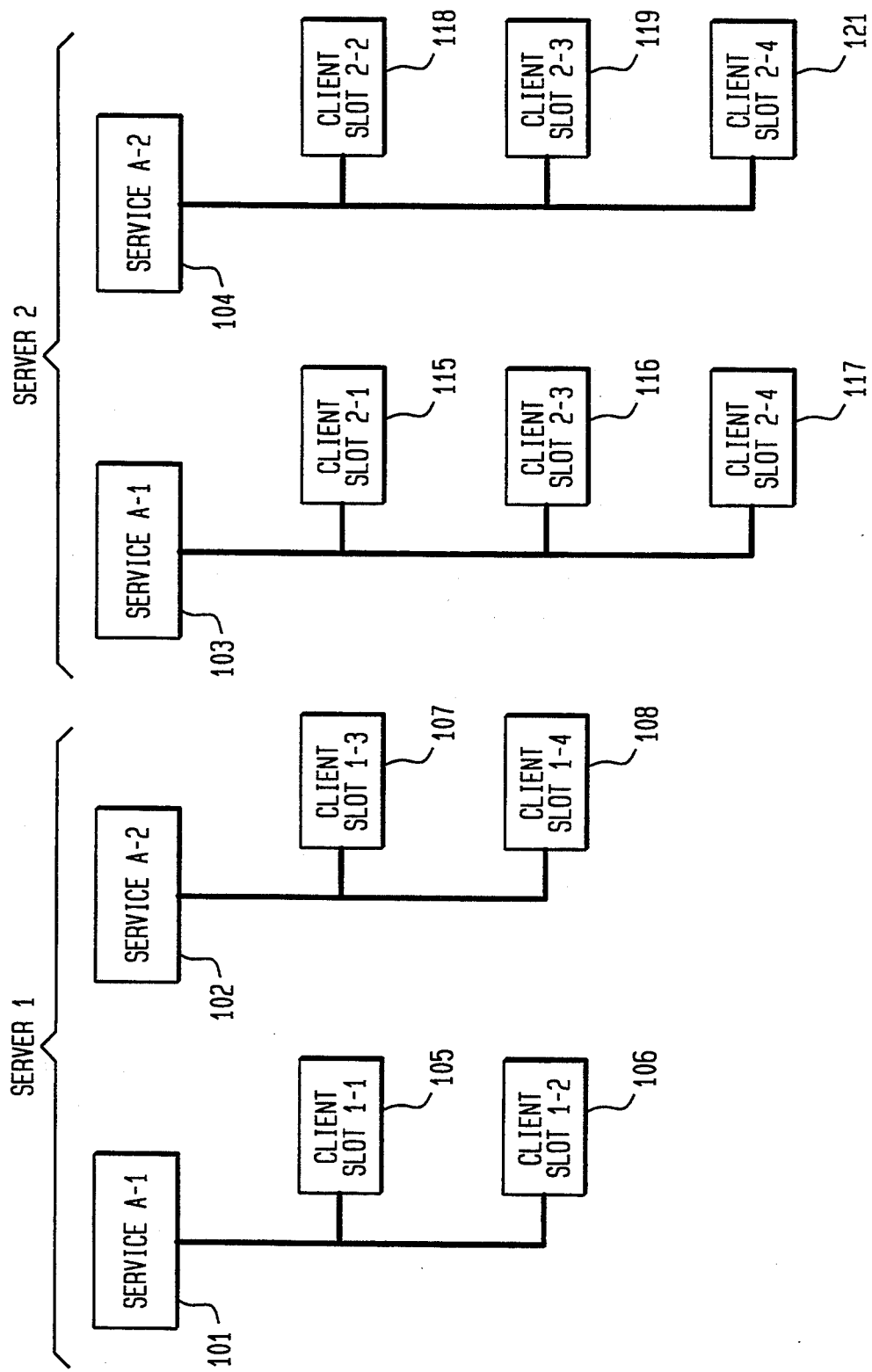

FIGS. 5 and 5A illustrate by example the data structures within each server (shown here as servers 1 and 2) to indicate server capacity and status to deliver a requested service. The status information is provided to the broker 30 for comparing the capacity to the local policy for each server as shown by communication paths 31-34 in FIG. 4.

In FIG. 5, server 1 is shown supporting two services 101 and 102 having service names $A_1$ and $A_2$, respectively. Similarly, server 2 supports services 103 and 104 having service names $A_1$ and $A_2$. Associated with each service 101-104 is a client capacity number 111-114 indicating the number of clients that can be processed by each server for the particular service. The client capacity number reflects the server's local policy for each service. As shown in FIG. 5, the client capacity number can be a scalar value which is reduced as the server increases its load. The current value of the capacity number 111-114 is therefore checked by the broker whenever the broker tries to use the server.

A second implementation of the database of server 1 is shown in FIG. 5A wherein client slots 105-108 are assigned to each service $A_1$ and $A_2$ (101 and 102). For example, assuming each server has four client slots, two client slots (105, 106 and 107, 108) can be allotted for each service 101 and 102, respectively in server 1. This is equivalent to a client capacity number of two for each service 101 or 102. Client slots allow the broker to determine the availability of servers by checking a flag indicating whether particular client slots are used.

However, a more powerful use of client slots is achieved in server 2 as shown in FIG. 5A by allowing certain client slots to provide multiple services. Again, only four client slots are allocated for server 2. The first client slot 115 is dedicated for use with service $A_1$(103) and the second client slot 118 is provided for service $A_2$ (104). In this case, however, the third and fourth client slots are made available to each service 116, 117, 119, 12 1. Therefore, if three requests are received for service $A_2$ and only one request for service $A_1$, then by making the client slots available for use with each service, all of the requests can be satisfied. Again, this is implemented by the server connection section 75 (FIG. 4) checking flags to determine the availability of each client slot. These flags indicate the status for the servers against which the local policies are checked in connection entries 922-926.

Through the use of the preview window and the overlapping of servers to provide different services, the broker mechanism 30 thus reduces the number of active network connections (31-34) necessary to poll the servers to obtain their status. Otherwise, active connections would be required from all of the servers in the network. Therefore, only a reasonably managed subset of servers is maintained by the broker 30 as active connections to reduce message traffic on the network and to simplify the computational overhead in the broker.

B. Scan Weights

Referring again to FIG. 4, because the capacity of each server to deliver a given service may not be equal depending upon the network policy, an additional parameter termed scan weight 73 is added. The scan weight 73 is the number of client requests which can be satisfied from a server before the particular server is removed from the preview window 72. Each server is assigned a particular scan weight value for each service by the network manager. The scan weight 73 allows the network manager to apply the network policy to more efficiently assign clients 10 to servers in a round-robin manner. The values chosen for the scan weight are developed as part of the capacity planning modelled in FIG. 3.

An example of scan weight operation is given in the server list 74 for service $A_1$ as shown in FIG. 4. Five servers 21, 22, 23, 24, and 25 having server entries 121-125, respectively, are determined to have the following capacities to access a service for a client: server 21,2 clients(10); server 22,6 clients(10); server 23,2 clients(10); server 24,4 clients(10); and server 25,2 clients(10). Without scan weight, the broker mechanism 30, using a purely round robin method of assigning servers, would reduce the list of five available servers 21-25 to just two available servers 22 and 24 after only 10 client requests have been suggested. This occurs because the servers having the least capacity, i.e. 21, 23 and 25, are suggested as often as the other servers, thus quickly using their capacity. After the first ten requests, only servers 22 and 24 have any capacity remaining. Further, only one server 22 would be available after the next four client requests. This rapid reduction in the available servers can produce single failure points which may disrupt a network.

A scan weight parameter 73 is therefore determined based on an equal distribution of the server capacities to handle client requests. The scan weight 73 controls the number of clients assigned to a particular server when it is at the top of the preview window. In our example, an appropriate allocation of clients per scan weight may be assigned as follows: 21,1 client(10), 22,3 clients(10); 23,1 client(10); 24,2 clients(10); and 25,1(10) client. By using these scan weight values, the servers having the greatest capacity, i.e. 22 and 24, will be assigned to multiple clients before being removed from the preview window. Thus, the client requests are evenly distributed across all available servers 21-25 based on their capacity. In this example, four servers would still be available after the first ten client requests have been satisfied.

C. CLIENT CONNECTION and MANAGEMENT OF BROKER

The client connection section 70 of the broker 30 is the interface for providing server suggestions to the clients. A client's request for a service is received on path 54. Client connection section 70 checks to insure that the service is located in the service list 71 of supported services in the broker 30. Further, client connection section 70 performs the necessary steps to suggest a server to the accessing client.

The management section 76 of the broker 30 provides control and status information relative to the operation of the broker 30. For example, the management section 76 can enable and disable service names, examines the size of the preview window 72, displays information on the current entries in the preview window, or other management functions.

V. BROKER OPERATION

Figure 6:
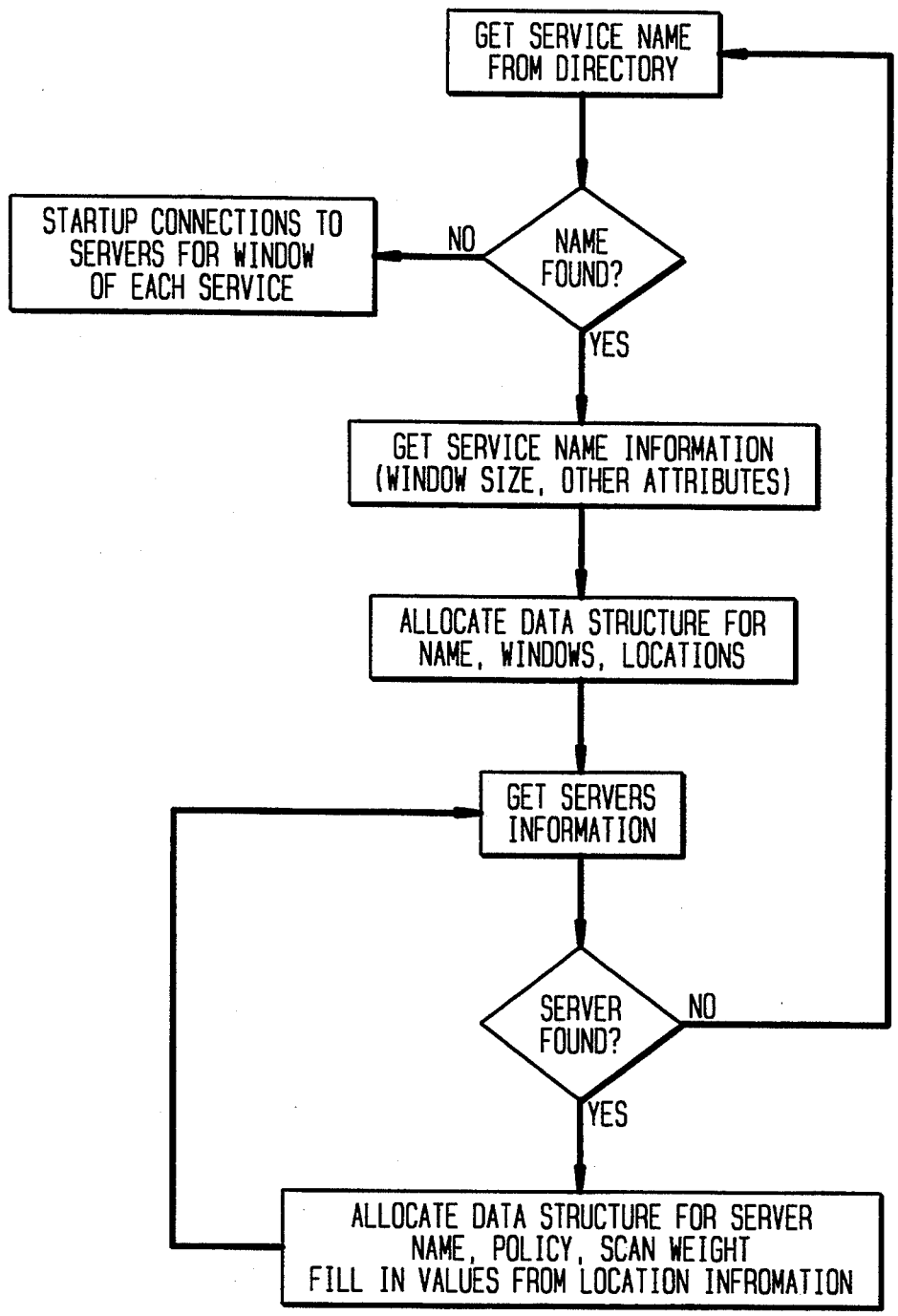
FIGS. 6 and 6A are flow charts describing the operation of the broker mechanism of the present invention.
Figure 6A:
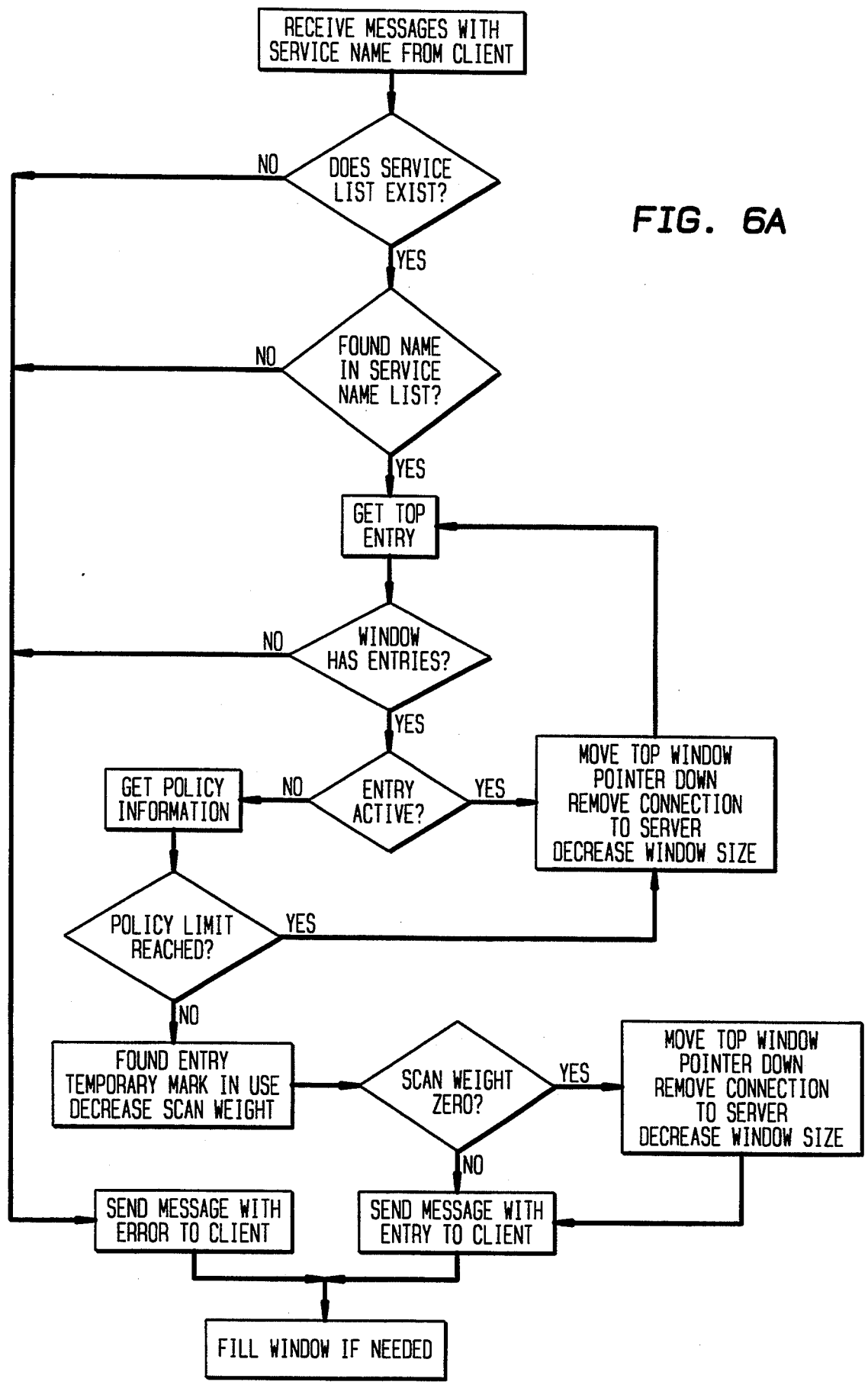

The operation of FIG. 4 is described by the flow charts of FIGS. 6 and 6A. FIG. 6 describes the inclusion of the local policies into the operating broker mechanism 30. FIG. 6A describes the operation of the broker upon receiving a client request for a server.

In operation upon broker 30 start-up, the services i.e., i service $A_1$, $A_2$ or $A_3$, are obtained from the network list in the distributed repository 42 functioning as a directory for all of the services. Once a service is found, the broker 30 begins to build a service list data structure 71 which includes the attributes for each of the services. Next, the server information for the particular service is obtained from the repository 42. If no servers are found, then a new service is obtained from the repository 42 and the process is repeated. However, if a server is found, then a server list data structure 74 is built for the particular service. The server list data structure 74 contains the local policy for each server supporting the service and the scan weight 73 for each server in the server list 74. Once all of the services stored in the repository are found, then the server connection section 75 begins to build the status connections used for the preview windows 72 for each service.

Referring to FIGS. 4 and 6A, the operation of the broker upon receiving a client request for a service is described. The broker 30 receives a message from the client 13 via path 54 containing the name of the service requested, i.e., service $A_1$, $A_2$ or $A_3$. The client connection section 70 receives the request and checks whether the service list 71 exists in the broker. If the service list 71 exists, the broker 30 checks whether the particular service requested (in this example service $A_2$) is contained in the service list 71. The broker 30 then obtains the top entry 226 in the preview window 72 for service $A_2$. Next, the broker checks whether the connection entry 926 is active, i.e., is there a connection from broker to server as on path 34. If it is not active, then the entry 226 is removed from the preview window 72. However, if the entry 226 is active, then the local policy information for the associated server 26 is obtained from entry 226 in the server list 74.

The local policy limit is then checked in connection entry 926 against the status information received for the server 26 on path 34. This is accomplished as described above in FIGS. 5 and 5A by checking either the client capacity number or the availability of client slots, depending upon the type of status indication that is used.

The availability of server 26 to support service $A_2$ is checked to make sure that its policy limit is not exceeded. If the server 26 has the necessary capacity as determined by either the client slots or the client capacity number, i.e. the current value is less than the client capacity number or there are available client slots as indicated by the flags, then, a message is sent to the client 13 suggesting server 26 to be used to deliver service $A_2$. The scan weight value 73 for server entry 226 is decreased and is checked to determine if the entry 226 should be removed from the preview window 72. The broker continues by refilling the preview window if necessary.

If, however, server 26 does not have the available capacity, then the next entry 224 in the preview window 72 is checked. This process continues until either an entry is found or no server is determined to be available. It is thus apparent that broker 30 need only check the status of a server when a request for a particular service is received and that particular server is in the preview window. For each entry in the preview window not having the necessary capacity or having been previously assigned, the entry is rotated out of the preview window and another entry refills the preview window. It may occur, however, that no servers are available to refill the preview window, in which case the size of the preview window would be reduced.

Under normal operations, the broker mechanism efficiently operates to receive client requests and suggest servers. However, if at any time during a request, the service list, name of the service or preview window do not exist, then the broker 30 will send an error message to the client 12.

An alternate embodiment of the present invention has the broker 30 suggest to the client 12, not only the top server entry 226 but also the next active server entry 225 in the preview window 72.

In operation, upon receiving a client request, the broker again would check the entry in the preview window. Once the broker finds an entry having the available capacity, it suggests that entry along with the next entry in the preview window. In this embodiment, only the scan weight of the first entry is decreased. The client then will attempt to access the service through the first entry. If however, the first entry fails for any reason, then the client attempts to use the second server entry without having to reconnect to the broker.

When using this embodiment, the broker does not need to continuously check the status of the two entries.

The status will be updated the next time the broker checks on those particular server entries.

The use of two entry suggestions is useful in the event of a failure by the first server to deliver the requested service. Failure of a server can occur due to other clients accessing the server directly thus using its capacity, failure of the hardware, line damage, etc. Thus, suggesting two servers provides for the situation in which the first server failed during the client's connection time to the server using the broker. The inclusion of a second server suggestion provides the client with an alternate server without having to recontact the broker. Thus, client connection time can be decreased by using two server suggestions.

As shown conceptually in FIG. 7, another embodiment of the present invention incorporates multiple brokers 30 and 31 for suggesting servers to different clients 11-19. The brokers 30-31 can be replications of each other supporting the same services. The brokers operate independently of each other to provide a high availability factor to the clients. An attendant tradeoff for the availability is an increase in overhead on the network as status information for the monitored servers in the preview window must go to each broker 30, 31. If however, the rate of client requests to the brokers 30, 31 is slow, then the brokers can adjust the rate at which they poll the servers for their status in the preview window. By reducing the polling rate in proportion to the number of brokers, the message traffic on the network will remain substantially the same as for a single broker while still providing high availability and eliminating the broker as a single point of failure.

Using multiple brokers, the scan weight value increases as a linear function of the number of brokers in the network provided the network policy is consistent among the brokers. This occurs because each broker maintains a separate preview window and yet the enforcement of the local policies is carried out by each individual server. Because servers for the same service will be contained in each broker's preview window and the brokers are independent of each other, the servers will be rotated independently of the other brokers preview window. Thus, because the server has the same scan weight in two separate preview windows, the scan weight value is effectively doubled.

The ability to have multiple brokers 30, 31 operating simultaneously provides a highly reliable system by alleviating any single point of failure. Further, the clients gain an increased opportunity to use a broker to suggest a server for delivering the requested service.

A further embodiment of the present invention uses multiple server lists having different priorities. The different lists each have their own preview windows. The use of prioritized server lists allows the client to obtain service when the servers in the higher priority service list are unavailable. This is done by automatically redirecting the client requests to the lower server list to provide the service, albeit at a less desirable service level, without the client needing to make a request for access to an additional service name.

What is claimed is:

1. A computer-implemented method for allocating a plurality of servers, each server having an available resource capacity, to a plurality of clients for delivering a plurality of services to said clients, the method comprising the steps of:
   a) developing a network policy for said plurality of servers by collecting a local policy for each of said servers, wherein the local policy for each server is based on an overall capacity of each server to deliver each of the plurality of services to said clients;
   b) receiving client requests for said services in a least one broker;
   c) making a server suggestion, from the broker to one of said clients making a request for one of said services, the server suggestion identifying a suggested one of said servers based on the network policy and available resource capacities of said servers, said suggested one of said servers having the available resource capacity to deliver said one of said services;
   d) making a request for said one of said services from said one of said clients to said suggested one of said servers in response to said one of said clients receiving the server suggestion of step c) from the broker,;
   e) operating the suggested one of said servers in accordance with its respective local policy to reject the request for said one of said services of step d) when the request exceeds a local policy limit for the respective local policy of the suggested one of said servers; and
   f) operating the suggested on of said servers in accordance with its respective local policy to accept the request for said one of said service of step d) when the request does not exceed the local policy limit for the respective local policy of the suggested one of said servers.

2. A method according to claim 1 wherein step (c) further includes:
   a) a creating a service list, within said broker, of available services from said network policy;
   b) creating a respective server list for each service in the service list, each server list containing a server entry for each server having the overall capacity to deliver a respective service; and
   c) monitoring, for each service in the service list, a subset of said server entire in said server list for suggesting said servers represented in said subset to said clients.

3. A method according to claim 2 wherein said step of monitoring said subset further includes the steps of:
   a) establishing a data path, the data path providing connectivity between each server represented in the subset and the broker, the data path for transmitting information regarding the available resource capacity of each server represented in the subset to said broker; and
   b) determining whether a first server of the servers represented int eh subset has an available client slot to deliver the service requested by said clients based upon the available resource capacity of said first server.

4. A method according to claim 3 wherein said step of making a suggestion is made when one of said servers being monitored has an available client slot to deliver said service.

5. A method according to claim 4 further comprising the steps of:
   a) disconnecting the data path from said first server when said data a path indicates no available client slots; and
   b) subsequently establishing with the broker a data a path from another of said plurality of servers in said server list supporting said service having available client slots.

6. A method according to claim 5 further comprising the steps of:
   a) developing a scan weight value for each of said plurality of servers supporting each service based on said network policy;
   b) creating a scan weight entry containing the scan weight value for each server entry in said server list;
   c) decreasing the scan weight value for a selected ne of said servers represented in the subset after said selected one is suggested to said client; and
   d) removing said selected one from the subset when said scan weight value is zero.

7. A method according to claim 1, wherein said step of developing a network policy includes:
   a) determining a set of service characteristics for each of said services;
   b) determining a service capability for one of said servers as a function of said sets of service characteristics and a set of server parameters of said one of said servers;
   c) comparing the service capability with a desired performance for said one server to determine if there is a match;
   d) varying the sets of service characteristics and the set of server parameter until said comparing step produces a match;
   e) storing said set of server parameters and said set of service characteristics as the local policy for said one server upon determination of a match;
   f) repeating step a)–e) for each of said plurality of servers; and
   g) collecting said local policies to obtain a network policy.

8. A method according to claim 1 wherein said computer network uses multiple brokers.

9. A method according to claim 8 wherein said multiple brokers are exact replicas of each other and operating independently.

10. A computer implemented method for allocating a plurality of servers, each server having an available resource capacity, to a plurality of clients in a network for delivering a plurality of services to said clients, and for reducing the communication overhead on the network, the method comprising the steps of:
   a) receiving a client request from one of the plurality of clients for one of said services in at least one broker;
   b) selecting a subset of servers from the plurality of servers based on the available resource capacity of each of the plurality of servers; and
   c) making a server suggestion, from the at least one broker, to one of the plurality of clients, the server suggestion identifying said subset of members to said one of the plurality of clients in response to said client request;
   d) making a request for said one of said services from sad one of said clients to said suggested one of said servers in response to said one of said clients receiving the server suggestion of step c) from the at least one broker,;
   e) operating the suggested one of said servers in accordance with its respective local policy to reject the request for said one of said services of step d) when the request exceeds the available resource capacity of the suggested one of said servers; and
   f) operating the suggested one of said servers to accept the request for said one of said services of step
   d) when the request does not exceed the available resource capacity of the suggested one of said servers.

11. A method according to claim 10 wherein said steps of selecting a subset of servers further comprises:
   (a) developing a network policy for said plurality of servers by collecting a local policy for each of said servers, wherein the local policy for each server is based on each server's capacity to deliver each of the plurality of services to said clients;
   (b) creating a service list within said broker of available services from said network policy;
   (c) creating a server list, containing server entries of available servers from said network policy, for supporting each of said services in said service list;
   (d) monitoring a subset of said server entries in the server list for each server.

12. A method according to claim 11 wherein said step of monitoring said subset further comprises the steps of:
   a) establishing a status path for transmitting information regarding the availability of client slots from each server in a set of servers supporting one of said services, to said broker;
   b) comparing the available client slots for a fist server of said set of servers against said first server's local policy; and
   c) determining whether said first server has an available client slot to deliver the service requested by said clients.

13. A method according to claim 12 wherein said step of suggesting is made when one of said servers being monitored has an available client slot to deliver said service.

14. A method according to claim 13 further comprising the steps of:
   a) disconnecting the data path from said first server when said data path indicates no available client slots; and
   b) subsequently establishing with the broker a data path from another of said plurality of servers in said server list supporting said service having available client slots.

15. A method according to claim 14 further comprising the steps of:
   a) developing a scan weight value for each of said plurality of servers supporting each service based on said network policy;
   b) crating a scan weight entry containing the scan weight value for each server entry in said server list;
   c) decreasing the scan weight value for a selected one of said servers represented in the subset after said selected one is suggested to said client; and
   d) removing said selected one from the subset when said scan weight value is zero.

16. A method according to claim 11, wherein said step of developing a network policy includes:
   a) determining a set of service characteristics for each of sad services;
   b) determining a service capability for one of said servers as a function of said sets of service characteristics and a set of server parameters of said one of said servers;
   c) comparing the service capability with a desired performance for said one server to determine if there is a match;

d) varying the sets of service characteristics and the set of server parameters until said comparing step produces a match;
e) storing said set of server parameters and said set of service characteristics as the local policy for said one server upon determination of a match;
f) repeating steps a)–e) for each of said plurality of servers; and
g) collecting said local policies to obtain a network policy.

17. A method according to claim 10 wherein said computer network uses multiple brokers.

18. A method according to claim 17 wherein said multiple brokers are exact replicas of each other operating independently.

19. A device for allocating a plurality of servers, each having an available resource capacity, to a plurality of clients for delivering one of a plurality of services to said clients, said servers and said clients being arranged in a computer network, the device suggesting a suggested one of the plurality of servers to a requesting one of the plurality of clients requesting a one of the plurality of services, the requesting one of the plurality of the clients making a request for one of the plurality of services to the suggested on of the plurality of servers, the suggested one of the plurality of servers operating to reject the request for the one of the plurality of services when the request exceeds a local policy limit for a respective local policy of the suggested one of the plurality of servers, the suggested on of the plurality of servers operating to accept the request for said one of the plurality of services when the request does not exceed the local policy limit for the respective local policy of the suggested one of the plurality of servers, the device comprising:
a) a broker including:
  (i) means for receiving client request for said service; and
  (ii) means for suggesting by the broker one of said servers to one of said clients making a request based on an available resource capacity, said one server being suggested having the available resource capacity to deliver said service; said means for suggesting further comprising:
    1) means for creating a service list, within said broker, of available services;
    2) means for creating a server list, containing server entries of available servers for supporting each of said services in said server list; and
    3) means for monitoring a subset of said server entries in said server list for suggesting said servers represented in said server list to said clients.

20. A device according to claim 19 wherein said means for monitoring further comprises:
a) a data path establishing connectivity from each server in a set of servers supporting one of said services to said broker, the data path for indicating available client slots for the server to said broker; and
b) means for determining whether said fist server has an available client slot to deliver the service requested by said clients.

21. A device according to claim 20 wherein said means for suggesting sends a message to said client when one of said servers has an available client slot to deliver said service.

22. A device according to claim 21 further comprising:
a) a scan weight value developed for each of said plurality of servers;
b) a scan weight entry containing the scan weight value stored in said broker for each server entry in said server list;
c) means for decreasing the scan weight value for said first server in the preview window after said first server is suggested to said client; and
d) means for removing said first server from the preview window when said scan weight value is zero.

23. A device according to claim 20, wherein the device further comprises
means for developing a network policy including,
a) means for determining a service capability for each server based on a plurality of sets of service characteristics and a set of local policy parameters;
b) means for comparing, for each of said servers, the service capability with a desired performance for each server to determine if there is a match;
c) means for varying, for each of said servers, the sets of service characteristics and the set of local policy parameters until said comparing step produces a match for each server; and
d) means for storing, for each of said servers, said set of local policy parameters and said set of service characteristics as the local policy for each server upon determination of a match;
means for suggesting by the broker one of said servers to one of said clients based on the network policy and the available resource capacity of said one of said servers.

24. A computer network comprising:
a) at least two brokers for allocating a plurality of servers having an available resource capacity to a plurality of clients for delivering one of a plurality of services to said clients;
b) such broker further including,
  i) means for developing a network policy for said plurality of servers by collecting a respective local policy for each of said servers, wherein the respective local policy for each server is based on an overall capacity of each server to deliver each of the plurality of services to said clients;
  ii) means for receiving client requests for said services in said broker;
  iii) the broker making a server suggestion to one of said clients making a request for one of said service, the server suggestion identifying a suggested available resource capacities of said servers, said suggested on of said servers having the available resource capacity to deliver said one of said services; and
c) said one of said clients making a request for said one of said services to said suggested one of said servers in response to said one of said clients receiving the server suggestion from the broker;
d) the suggested one of said server rejecting the request for said one of said services when the request exceeds a local policy limit for the respective local policy of the suggested one of said servers; and
e) the suggested one of said servers accepting the request for said one of said services when the request does not exceed the local policy limit for the respective local policy of the suggested one of said servers.

* * * * *